Patented Apr. 8, 1941

2,237,337

UNITED STATES PATENT OFFICE 2,237,337

METHOD OF MAKING FIBROUS PRODUCT

Simon Collier, Plainfield, N. J., and Fred T. Randolph and William G. Collins, Waukegan, Ill., assignors to Johns-Manville Corporation, New York, N. Y., a corporation of New York No Drawing. Application November 28, 1936, Serial No. 113,106

3 Claims. (Cl. 92—21)

This invention relates to an article of manufacture and the method of making the same and, particularly, to a fibrous product including an inorganic binding material distributed therethroughout and formed at the position of final bonding and at an elevated temperature.

There have been numerous investigations of means for bonding together fibres of asbestos or the like into self-sustaining units such as felted or molded sheets, strands of yarn, or woven fabrics.

Recently, there has been described, in U. S. Patent 2,033,928, issued March 17, 1936, to Driscoll and Bruce, an improved product and the method of making it. This product of Driscoll and Bruce may be made by lodging in or upon asbestos fibres a slightly soluble metal compound, such as lime, and then impregnating into the fabric a solution of soluble silicate or the like, to cause precipitation of a bonding agent.

We have now discovered that a stronger and harder article may be made when both the reacting substances are initially lodged upon the fibres and within the self-sustaining unit, in non-migratory, substantially inert or non-reactive condition, and the unit including the said substances is then warmed to an elevated temperature and in the presence of water vapor, to cause ready interaction of the said substances and the consequent production of a precipitate that bonds the fibres together, the article being subjected finally to drying. A latent bonding composition is thus developed into an active bonding agent.

Suitably, the substances that are used to produce eventually the precipitate of bonding material are each only slightly or slowly soluble in water at ordinary temperatures and are adapted to interact readily with the formation of the bonding precipitate when the temperature of their aqueous mixture is raised substantially, that is, approximately near the boiling point of water or higher. At least one of the said substances is one that should dissolve to a large extent at that temperature and thus greatly increase the rate of reaction upon the other of the substances.

One of the said substances may be a slightly soluble metal compound adapted to react with a silicate, or the like, to form an insoluble compound therewith. Thus, there may be used an alkaline earth metal oxide or hydroxide, as, for instance, hydrated lime.

The other of the said substances should be one that is relatively non-reactive or inert toward the said metal compound at the ordinary temperatures of original formation of the aqueous mixture but adapted to become readily reactive with the said compound at an elevated temperature and to form therewith a precipitate having bonding power when subsequently dried. Thus, this second substance may be sodium silicate, of steam soluble grade, added in finely divided solid form to the aqueous mixture of lime and fibres from which the self-sustaining fibrous unit mentioned is to be made. Such a silicate is one commonly sold as "F grade" silicate of soda and containing about 23.5 parts by weight of sodium oxide to 74.4 parts by weight of silica. It is a common anhydrous variety. It is not readily soluble in cold water.

Because lime and sodium silicate give excellent results, when used jointly, the invention will be illustrated by a specific example in which these substances are utilized.

These substances are mixed with asbestos fibres, in the presence of water. The fibres and associated substances are then fabricated, as, for example, into paper, either thin or thick, millboard, pressed sheets, or the like. Also, yarn or woven fabrics can be treated as described hereinafter.

The general method is illustrated by the following examples.

A felted asbestos product may be made on a conventional paper or millboard machine. Thus, there may be formed a thick sheet, say of thickness of one-fourth to one-half inch or more, having the lime and silica originally present in approximately the same uniform proportion to each other and to the fibres throughout the entire article.

For instance, there is formed an intimate aqueous suspension or mixture including 2,000 parts by weight of Canadian (chrysotile) fibres of length ordinarily used in making asbestos millboard, 496 parts of hydrated lime, and 406 parts of dry, finely divided sodium silicate of the kind described, the major portion, say 95%, of the particles of silicate and lime being of size to pass through a 100-mesh screen. The amount of water used in such a mixture will depend in part upon the equipment that is to be used in forming a unit from the mixture. Thus, the proportion of water may be about 98.6 parts by weight to 1.4 parts of total solids when a millboard is to be formed from the said mixture.

The lime, it will be noted, is used in this example in excess of the silicate, so that no substantial amount of the steam-soluble sodium silicate will remain in the finished product. It is satisfactory and, in most cases, desirable to have the lime and the silicate present in the millboard in approximately chemically equivalent quantities.

In forming a millboard, there may be used, except as herein specified, the machine and method steps described in U. S. Patent Reissue 12,594, issued to Hatschek on January 15, 1907.

The solid materials of the mixture are thus formed into a wet felt that may be quite thick, as stated. The operations up to this point are suitably made at ordinary temperatures, the original mixture having been made with cold water.

The self-sustaining unit or sheet, including the fibres, lime, and solid sodium silicate dispersed throughout the sheet is then subjected to treatment to cause reaction of the lime and silicate. Thus, the sheet, either alone or stacked upon other sheets of the same kind, is subjected to an elevated temperature, as, for instance, by being stored in a steam room at a temperature near the boiling point of water. The exposure to the elevated temperature is continued until the sheet or sheets have been warmed throughout and the silicate caused to dissolve and react with the lime, to form precipitated calcium silicate. I have used to advantage such a time of heating that the temperature becomes substantially uniform throughout the entire sheet or stack of sheets.

The product having the bonding material thus precipitated therein is subjected to drying. Thus, the product may be maintained at an elevated temperature, say at about or slightly below 212° F., till the moisture content is reduced to a few per cent by weight or less.

It will be noted that there is used in this example a very large proportion of the substances that jointly precipitate the bonding material. In spite of this fact, the product shows practically no surface crusting or efflorescence and is uniformly strong and hard throughout.

For the production of a quicker cure, that is, the reacting of the inorganic binder materials, heating may be accomplished by placing the sheets in a closed container and introducing high pressure saturated steam, say at 60 to 100 pounds to the square inch, gage pressure. In this manner, reaction is produced in the presence of water vapor.

To obtain increased strength and density of the finished product, the sheet material from the millboard machine, before being subjected to the elevated temperature, to cause reaction and precipitation, may be compressed against a water-permeable member. Thus, the sheet may be pressed against a properly supported wire gauze or burlap at a pressure of 100 pounds to the square inch, more or less, to remove excess water.

The resulting product, in a typical specimen, has a modulus of rupture of 4,320 pounds, a density of 77 pounds to the cubic foot, and moisture absorption, upon immersion, of 36 parts by weight to 100 parts of the predried sheet material. In spite of this substantial moisture absorption, the tensile strength, when wet, was 1,734 pounds to the square inch as compared with 2,553 pounds to the square inch, dry. These test figures apply to a product made at a pressure of 60 to 75 pounds to the square inch, in the pressing step described above for removal of excess water.

In the product made as described, the sheet is built up of individually very thin laminae having the fibres therein oriented predominantly in direction generally parallel to the face of the finished sheet. The product is readily workable, that is, may be sawed or nailed, and is slightly yieldable before breakage.

In another example of the general method illustrated above, there was formed a mixture including 69 parts by weight of asbestos fibres of the kind described above, 17 parts of hydrated lime, and 14 parts of the solid particles of sodium silicate, with sufficient water to form a fluent mixture. This mixture was flowed into a mold with filtering bottom and compressed against the said bottom by means of a suitable die plate, in this instance at a pressure of 1,400 pounds to the square inch.

A product made in this manner had a density of 98 pounds to the cubic foot and a modulus of rupture of 4,700 pounds.

As distinguished from asbestos and Portland cement boards, our improved products are remarkably resistant to elevated temperatures. Thus, the illustrative specimens that have been described may be plunged red hot into cold water without serious spalling. Also, the product having a modulus of rupture of 4,700 pounds, before being heated, had a modulus of well over 1,200 pounds, actually 1,380 pounds in one test, after being heated to a temperature of 1,500° F. and then cooled in air for testing.

Also, our improved products have a very low coefficient of expansion on absorption of moisture, as compared with starch-bonded asbestos products of conventional type and which our products may replace in many commercial uses.

In making a woven or braided product in accordance with the general method of this invention, there is first formed a strand of yarn in any suitable manner including twisting together of the fibres of asbestos. The yarn is then immersed in an aqueous mixture of the two substances, both in solid finely divided form, as described, and the thus impregnated yarn is fabricated as by braiding or weaving. The fabricated article is then subjected to an elevated temperature, as, for instance, to steam in a closed chamber to cause the solution of the sodium silicate and precipitation of calcium silicate throughout the self-sustaining units or strands of the yarn. The resulting fabricated article is relatively hard and strong and has been found very valuable for a friction material running in oil where the ordinary organic bonded type would fail through disintegration of the bond.

In making both the felted and woven asbestos products described, the fibres are interlocked. This interlocking is produced in the felting by matting fibres together, whereas in the weaving process the interlocking is caused by spinning as the preliminary step to the subsequent fabrication of the article. In each instance, the interlocked fibres have the inorganic substances intimately associated therewith and preferably approximately uniformly distributed therebetween.

It will be understood that the details given are for the purpose of illustration, not restriction, and that variations within the spirit of the invention are intended to be included in the scope of the appended claims.

What we claim is:

1. In making a fabricated asbestos product the method which comprises: spinning asbestos fibres into a yarn, introducing into the yarn approximately equal proportions of finely divided, anhydrous, steam soluble sodium silicate and hydrated lime, weaving the thus treated yarn into a fabric, and subjecting the fabric to an elevated temperature in the presence of moisture to cause said sodium silicate and hydrated lime to react to form a bonding material throughout the product.

2. The method comprising forming an article including asbestos fibres and approximately equal proportions of finely divided, anhydrous, steam soluble sodium silicate and hydrated lime, with said asbestos fibres in interlocked relationship and constituting a predominate part by weight of the dry materials, and subjecting the article to an elevated temperature in the presence of moisture to cause said sodium silicate and hydrated lime to react to deposit a water-insoluble, heat-resistant binder in said article.

3. The method comprising forming an aqueous suspension including asbestos fibres and approximately equal proportions of finely divided, anhydrous, steam soluble sodium silicate and hydrated lime, with said asbestos fibres constituting a predominate part by weight of the dry materials, forming said fibres into a felted mat with said sodium silicate and lime contained therein, and subjecting said felted mat to an elevated temperature in the presence of moisture to cause said sodium silicate and hydrated lime to react to deposit a water-insoluble, heat-resistant binder in said mat.

SIMON COLLIER.
FRED T. RANDOLPH.
WILLIAM G. COLLINS.